Figure 1:
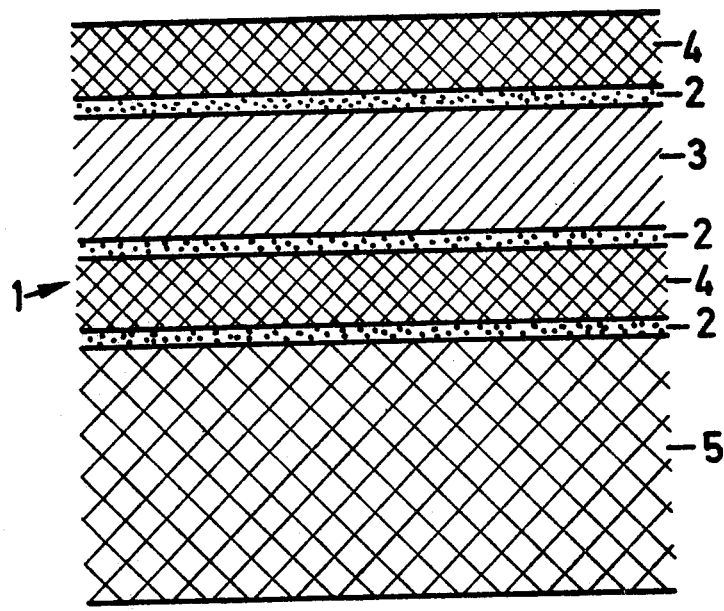

United States Patent [19]

Festag et al.

[11] 4,172,914
[45] Oct. 30, 1979

[54] PROCESS FOR THE MANUFACTURE OF AN AL/PLASTIC LAMINATE FOIL AND THE CONSTRUCTION OF THAT LAMINATE

[75] Inventors: Werner Festag, Schaffhausen; Klaus Farrenkothen, Dübendorf; Hans-Ueli Müller, Schaffhausen, all of Switzerland

[73] Assignee: Swiss Aluminium Ltd., Chippis, Switzerland

[21] Appl. No.: 804,629

[22] Filed: Jun. 8, 1977

[30] Foreign Application Priority Data

Jun. 14, 1976 [CH] Switzerland ............... 7501/76

[51] Int. Cl.² ............ B32B 27/08; B65D 31/02; B32B 15/08; B65D 1/28
[52] U.S. Cl. ............................ 428/35; 156/332; 156/196; 156/331; 426/126; 426/127; 428/339; 428/424; 428/458; 428/335; 428/332
[58] Field of Search ............... 426/126, 127; 156/60, 156/233, 332, 196, 224, 331; 428/332, 339, 340, 341, 424, 425, 457, 458, 480, 35, 335, 336; 220/64

[56] References Cited

U.S. PATENT DOCUMENTS

| | | | |
|---|---|---|---|
| 3,136,468 | 6/1964 | Keller | 426/126 |
| 3,556,816 | 1/1971 | Nughes | 426/126 |
| 3,572,499 | 3/1971 | Mondane | 426/126 |
| 3,616,190 | 10/1971 | Shaw | 426/126 |
| 3,658,562 | 4/1972 | Wilson | 426/126 |
| 3,949,114 | 4/1976 | Viola et al. | 426/126 |
| 4,009,312 | 2/1977 | Hayashi et al. | 426/126 |

FOREIGN PATENT DOCUMENTS 1236904 3/1967 Fed. Rep. of Germany.

OTHER PUBLICATIONS

"Aluminium", vol. 45, No. 5, May 1969, p. 284.

*Primary Examiner*—John E. Kittle
*Attorney, Agent, or Firm*—Bachman and LaPointe

[57] ABSTRACT

A process for the manufacture of an Al/plastic laminate foil is described. The laminate comprises an aluminum foil with plastic foil stuck on to at least one of its sides whereby the plastic foils exhibits an elongation at fraction of 80–100% and the adhesive joining the components achieves a shear strength of at least 0.3 N/mm². The plastic foils bear a greater part of the applied load when the laminate foil is stressed. The laminate foil is suitable for the manufacture of containers by deep drawing whereby no cracks or macropores form in the Al foil. The laminate effectively excludes light, water vapor and aromas from external sources and prevents the loss of aroma from the contents of such containers.

14 Claims, 2 Drawing Figures

PROCESS FOR THE MANUFACTURE OF AN AL/PLASTIC LAMINATE FOIL AND THE CONSTRUCTION OF THAT LAMINATE

The invention relates to a process for the manufacture of an aluminum/plastic laminate foil and the construction of that foil which is suitable in particular for the production of containers for holding sensitive goods such as foodstuffs, pharmaceuticals, chemicals and similar products, whereby the said containers are highly efficient at excluding light, oxygen, water vapor and aromas from external sources, and also at preventing loss of aroma from the contents of the container itself.

Aluminum/plastic laminate foils are used a great deal today to make rigid or flexible forms of packaging for holding goods such as foodstuffs, pharmaceuticals, chemicals etc. The known, currently used Al/plastic laminate foils are very efficient at excluding light, oxygen, water vapor and aromas from external sources and at preventing loss of aroma from the contents. They also prevent goods from perishing and prevent changes in product quality over long periods of time. Contained in such packaging, sterilized foodstuffs such as precooked foods, meat and vegetable products can be stored at room temperature for more than 1–2 years without any noticeable changes taking place in flavor or quality.

In order to provide the Al foil in the Al/plastic laminate with the maximum possible elongation, thus making it more able to withstand the mechanical stressing involved for example in operations requiring pulling, folding and bending, plastic foils with relatively low elongation at fracture (20–100%) and tensile strength values of 10–20 kp/mm$^2$ have been recommended up to now. By coating with a two component adhesive it was possible to produce Al/plastic laminate foils which withstood an elongation of 20–30% without producing any damage to the Al foil and therefore without losing their barrier properties after the unavoidable folding and tensile stressing (see for example Aluminium, Vol 45, No. 5, May 1969, p. 284 bottom left and German Pat. No. 1,236,904, column 4, last paragraph).

In the case of Al laminate foils which have been known up to now, it has been found that although the sensitive Al foil joined to plastic foils is protected to a large extent from mechanical loading, the limited elongation which it exhibits impairs the properties of the laminate foil in that it can not be used for the manufacture of flexible or semi-rigid containers by the deep drawing process normally used with plastic foils. Although such Al laminate foils are used a great deal for example for forms of packaging such as flat bags or pouches, tubular bags, side and end sealed bags, blister packaging etc. they are still excluded from important sectors of packaging technology.

Because of the low elongation of the aluminum foil, it has not been possible up to now to deep draw semi-rigid or flexible Al/plastic laminate foils into trough-shaped containers, as for example is achieved in the manufacture of containers made of plastics, since in the stretching operation involved, the aluminum foil forms cracks and pores and therefore loses its barrier properties.

The object of the invention presented here is then to produce an aluminum/plastic laminate foil with which the above described disadvantages associated with the Al laminate foils known up to now, are avoided and which exhibit not only a very pronounced ability to withstand stresses due to tensile, bending and ramming forces, but also make deep drawing possible because of the high elongation which the said Al plastic laminate foil possesses.

The object of the invention is achieved by a process in which an aluminum foil is covered on one or both sides with plastic foil which exhibits an 80–180% elongation at fracture, bears a larger load than the Al foil, and is joined to the Al foil by means of an adhesive, intermediate layer which achieves a shear strength of at least 0.3 N/mm$^2$ and in such a way that the components of the laminate foil are load sharing.

The Al/plastic laminate foil produced by the said process of the invention is such that it comprises an Al foil, at least one layer of a hardened two component adhesive, such as a two component polyurethane-based adhesive, and at least one plastic foil which exhibits an 80–180% elongation at fracture and is able to bear a greater load than the aluminum foil.

It has now been found that the elongation at fracture of the Al foil in combination with plastic can be increased considerably, if
 (a) the elongation at fracture of the plastic foil is 80–180%
 (b) the load bearing capacity of the plastic foil over the desired change in length is greater than the load bearing capacity of the aluminum foil, and
 (c) the adhesive used to join the components of the laminate exhibits a shear strength of $>0.3$ N/mm$^2$.

If these three criteria are observed, then it is possible to manufacture Al/plastic laminate foils which achieve an elongation of 40–120% in a tensile test without tearing or forming macropores.

If this Al/plastic foil is tensile stressed in all directions, e.g. by compressed air forming or stamping, it is possible to achieve a 20–60% increase in surface area, forming containers which are permanent in shape and at the same time keeping the Al foil intact.

It was also found that the strength and elongation of the plastic foil at fracture are not suitable criteria for the selection of the plastic foil which, in combination with the Al foil, can prevent the aluminum from tearing and forming pores. In selecting the plastic foil, it is much more important that the plastic foil bear a greater proportion of the load within the desired elongation than the Al foil, i.e. the load carried by the plastic foil should be greater than the resistance to deformation exhibited by the Al foil.

Moreover, it is necessary that the plastic foil be joined at the Al foil by an adhesive which has a shear strength of more than 0.3 N/mm$^2$. The peeling strength which is normally measured to determine the bond strength of Al/plastic laminate foils is not a suitable criterion for choosing the correct adhesive.

As far as the shear strength below 0.3 N/mm$^2$ is concerned, it has been found that the use of adhesives with such low shear strength values leads to cracking and pore formation in the aluminum/composite foil even when used with plastic foils which exhibit an optimum strength-elongation behavior. Further advantageous constructions of the Al/plastic laminate foil are illustrated in the following description.

Figure 2:
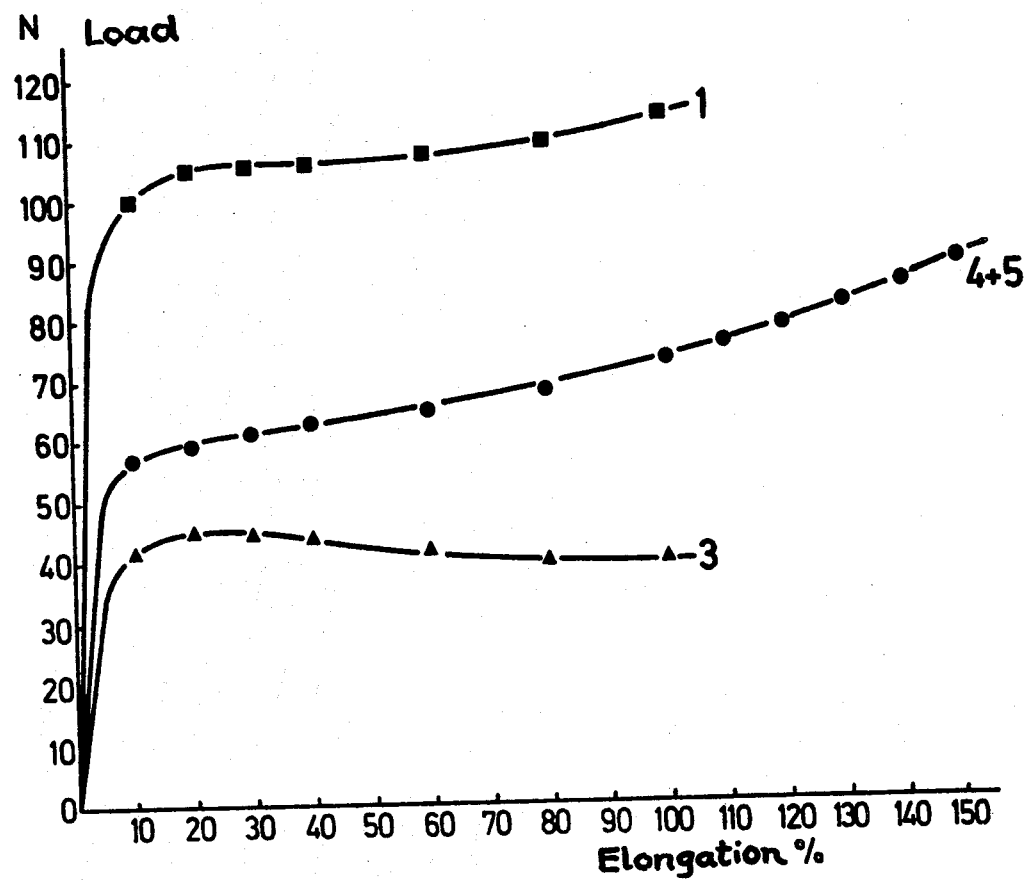

The drawings show in a simplified, schematic manner, an exemplified embodiment of the invention viz:
 FIG. 1 A section through an Al/plastic laminate foil.
 FIG. 2 A load-elongation diagram obtained by measuring with 15 mm wide strip samples in accordance with the specification DIN 53455.

In the process for manufacturing the Al-plastic foil 1 shown in FIG. 1, 1.5–2.5 g/m² (dry weight) of a two component adhesive 2 which exhibits shear a strength of 2.50 N/mm² is deposited on a 20 μm thick Al foil 3 (preferably soft annealed 99.2% Al) by means of a suitable roller which is not shown here. The adhesive 2 is dried and cured at 100°–120° C. and then a 12.5 μm thick polyethylene tere phthalate foil 4 immediately after treating with a corona discharge in such a way that it has a surface tension of 56 dynes/cm, is stuck on to the aluminum foil 3 on top of the adhesive 2 by passing the laminate over a roll heated to 85°–90° C. and with the aid of a rubber pressure roll (not shown here).

The polyester or polyethylene terephthalate foil 4 exhibits an elongation at fracture of 150% and the following load-elongation behavior

| Elongation | Load |
| --- | --- |
| 10% | 97 N/mm² |
| 30% | 108 N/mm² |
| 60% | 125 N/mm² |
| 100% | 147 N/mm² |
| 140% | 158 N/mm² |
| 150% | 165 N/mm² |

The Al foil is preferably covered on both sides with the same polyester foil.

Finally 2.0–3.5 g/m² of the same adhesive is deposited on one of the polyester foils 4 of the Al plastic foil 1 dried at 110° C. and covered with a 50 μm thick, unstretched polypropylene foil 5 which exhibits a surface tension of 50–53 dynes/cm after prior treatment with corona discharge, the laminating being done by means of a rubber roller at a roll temperature of 105° C.

After curing the adhesive 2, the Al/plastic laminate foil 1 yielded a force-elongation diagram as shown in FIG. 2. If the force producing a specific elongation in the polyester foil 4 and the polypropylene foil 5 is subtracted from the force-elongation curve for the Al/plastic foil, then the force-elongation curve for the Al foil 3 is obtained. From the diagram shown in FIG. 2 it can be seen that the tensile forces borne by the polyester foils 4 are greater at all elongations than the tensile force borne by the Al foil 3 at the same elongation. The elongation at fracture of the polyester-foil can, depending on the application, be between 80% and 180%.

The Al/plastic laminate foil according to the invention is particularly well suited for the manufacture of containers by the well known deep drawing process.

Containers were produced with the Al/plastic foil 1 by stretching the foil 1 over a negative mold which draws on an area of 125 mm x 125 mm of the Al/plastic foil, and shaping the foil into a 30 mm deep trough using compressed air at a pressure of 3.2 bar.

The container produced by this method, which is not described in any greater detail here, had a stable shape after deep drawing and, advantageously, the Al foil 3 exhibited no macropores or cracks. Such a container filled with a ready cooked meal (rice with pieces of meat) and having a lid made up of 12 μm thick polyethylene terephthalate 12 μm thick Al/75 μm thick polypropylene, sealed and sterilized at 121° C. for 30 min in a counter pressure autoclave at 2.6 bar, still exhibited contents in perfect condition after 1 year of storage at 20°–25° C.

What we claim is:

1. In a process for the manufacture of an aluminum-plastic laminate foil having good elongation without the formation of cracks or macropores for the production of deep-drawn containers, comprising an aluminum foil with plastic foil bonded to at least one of its surfaces, wherein said containers are intended to effectively exclude light, oxygen, water vapor and aromas from external sources and which prevent loss of aroma from the contents which consist of sensitive substances such as foodstuffs, pharmaceuticals, chemicals and similar substances, the steps comprising bonding at least one plastic foil substantially throughout to at least one surface of said aluminum foil by means of an adhesive layer in such a way that all components of the laminate are load sharing, said plastic foil exhibiting an elongation at fracture of 80–180% and bearing a greater load than that carried by said aluminum foil, said adhesive layer, when laminated, having a shear strength of at least 0.3 N per mm.², thereby increasing the elongation at fracture of the aluminum foil in combination with plastic and thereby obtaining aluminum-plastic laminate foils which achieve an elongation of 40–120% in a tensile test without tearing or forming macropores.

2. The process for the manufacture of an aluminum-plastic laminate foil according to claim 1 including the steps of applying said adhesive layer to at least one surface of said aluminum foil, prior to bonding said plastic foil to said aluminum foil and then thereby bonding said plastic foil to said aluminum foil.

3. The process for the manufacture of an aluminum-plastic foil according to claim 1 in which said plastic foil is a polyester foil.

4. The process for the manufacture of an aluminum-plastic laminate foil according to claim 1 in which said plastic foil is a polyester foil and in which a polyester foil is bonded to each surface of said aluminum foil.

5. The process for the manufacture of an aluminum-plastic laminate foil according to claim 1 in which said plastic foil is a polyester foil and including the further step of bonding an unstretched polypropylene foil, having a surface tension of 50–53 dynes per centimeter, after having been given corona discharge treatment, to said polyester foil by means of a second layer of said adhesive.

6. A process according to claim 1 wherein said bonded foil is deep drawn into container shape.

7. An aluminum-plastic laminate foil having good elongation without the formation of cracks or macropores for the production of deep-drawn containers, said laminate having a plastic foil bonded substantially throughout to at least one side of an aluminum foil, wherein said containers effectively exclude light, oxygen, water vapor and aromas from external sources and which prevent loss of aroma from the contents which consist of sensitive substances such as foodstuffs, pharmaceuticals, chemicals, and the like, said laminate comprising:

an aluminum foil;
   at least one layer of an adhesive on at least one surface of said aluminum foil, said adhesive achieving a shear strength of at least 0.3 N per mm.²; and
   at least one plastic foil which has an elongation at fracture of 80–180% bonded substantially throughout to said at least one surface of said aluminum foil by means of said adhesive, said aluminum foil being joined to said plastic foil in such a way to form a laminated foil component wherein all components of the laminate are load sharing and said plastic foil bearing a greater load than that of the aluminum foil, thereby increasing the elongation at fracture of the aluminum foil in combination with plastic and thereby obtaining aluminum-plastic laminate foils which achieve an elongation of 40–120% in a tensile test without tearing or forming macropores.

8. The aluminum-plastic laminate foil according to claim 7 in which said adhesive is a two component, polyurethane-based adhesive which achieves a shear strength of 0.3 N per mm.$^2$.

9. An aluminum-plastic laminate foil according to claim 7 in which said plastic foil is a polyester foil and said adhesive is a two-component urethane adhesive.

10. The aluminum-plastic laminate foil according to claim 9 which further comprises an unstretched polypropylene foil which has a surface tension of 50–53 dynes per cm. after having been given corona discharge treatment bonded to said polyester foil by means of a second layer of said adhesive.

11. The aluminum-plastic laminate foil according to claim 10 in which said second layer of adhesive on said polyester foil has a weight of 2–3.5 g. per m.$^2$ when dry.

12. The aluminum-plastic laminate foil according to claim 10 in which the polypropylene foil has a thickness in the range of 40–60 μm.

13. The aluminum-plastic laminate foil according to claim 7 which comprises a layer of said adhesive on each surface of said aluminum foil and in which said plastic foil is a polyester foil and said polyester foil is bonded to each surface of said aluminum foil by means of said adhesive.

14. The aluminum-plastic laminate according to claim 7 wherein said laminate is deep drawn into the shape of a container.

* * * * *